(12) United States Patent
Nedorezov et al.

(10) Patent No.: US 9,499,164 B2
(45) Date of Patent: Nov. 22, 2016

(54) CONTROLLING A CLUTCH BETWEEN AN ENGINE AND A MOTOR DURING A SHIFT EVENT IN A HYBRID VEHICLE

(71) Applicant: Ford Global Technologies, LLC, Dearborn, MI (US)

(72) Inventors: Felix Nedorezov, Rochester Hills, MI (US); Kenneth Jahr, West Bloomfield, MI (US); Alexander O'Connor Gibson, Ann Arbor, MI (US); Todd McCullough, Bloomfield Hills, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/547,210

(22) Filed: Nov. 19, 2014

(65) Prior Publication Data

US 2016/0137190 A1    May 19, 2016

(51) Int. Cl.
  *B60W 20/00*    (2016.01)
  *F16D 48/06*    (2006.01)

(52) U.S. Cl.
  CPC .............. *B60W 20/40* (2013.01); *F16D 48/06* (2013.01); *B60W 2510/0657* (2013.01); *B60W 2710/025* (2013.01); *Y10S 903/946* (2013.01)

(58) Field of Classification Search
  CPC .............. B60W 2510/0671; B60W 2510/083; B60W 2510/102; B60W 2510/244; B60W 2710/023; B60W 10/107; B60W 10/30; B60W 20/10; B60W 20/108
  USPC .......................... 701/48, 51, 54, 58, 84, 102
  See application file for complete search history.

(56) References Cited

U.S. PATENT DOCUMENTS

| | | | | |
|---|---|---|---|---|
| 4,855,914 A * | 8/1989 | Davis | ................... | B60W 10/115 477/154 |
| 5,982,045 A * | 11/1999 | Tabata | ..................... | B60K 6/48 290/17 |
| 8,565,990 B2 | 10/2013 | Ortmann et al. | | |
| 8,965,649 B1 * | 2/2015 | Thor | ..................... | B60W 10/02 192/3.57 |
| 9,150,219 B2 * | 10/2015 | Wang | ........................ | B60K 6/48 |
| 2006/0064225 A1 * | 3/2006 | Tabata | ..................... | B60K 6/48 701/96 |
| 2007/0102211 A1 * | 5/2007 | Nozaki | .................... | B60K 6/48 180/65.7 |
| 2007/0259755 A1 * | 11/2007 | Tanishima | ............. | B60K 6/387 477/3 |
| 2007/0278022 A1 * | 12/2007 | Tanishima | ............. | B60K 6/383 180/65.285 |
| 2008/0302324 A1 * | 12/2008 | Aswani | .................. | B60K 6/485 123/179.3 |
| 2009/0118082 A1 * | 5/2009 | Heap | ...................... | B60K 6/445 477/5 |
| 2009/0118084 A1 * | 5/2009 | Heap | ...................... | B60K 6/365 477/5 |
| 2009/0118086 A1 * | 5/2009 | Heap | .................... | B60W 10/06 477/5 |

(Continued)

*Primary Examiner* — Truc M Do
(74) *Attorney, Agent, or Firm* — David B. Kelley; Brooks Kushman P.C.

(57) ABSTRACT

A hybrid electric vehicle includes an engine, an electric motor, a transmission gearbox, and a clutch selectively coupling the engine to the electric motor. Engine speed can drop dramatically when operating at high speeds during a scheduled shift event in the gearbox. To reduce the effects felt by the engine speed change, at least one controller is provided and programmed to slip the clutch when locked in response to a drive torque, estimated to be present upon completion of an anticipated shift event, exceeding available negative torque, such as regenerative torque and engine braking torque.

17 Claims, 3 Drawing Sheets

(56) References Cited

U.S. PATENT DOCUMENTS

| | | | | |
|---|---|---|---|---|
| 2009/0118915 A1* | 5/2009 | Heap | | B60K 6/365 701/51 |
| 2009/0118931 A1* | 5/2009 | Kaminsky | | B60K 6/445 701/54 |
| 2009/0118936 A1* | 5/2009 | Heap | | B60K 6/365 701/54 |
| 2009/0118949 A1* | 5/2009 | Heap | | B60K 6/445 701/55 |
| 2010/0174429 A1* | 7/2010 | Hase | | B60K 6/48 701/22 |
| 2012/0101697 A1* | 4/2012 | Hawkins | | F16H 61/061 701/51 |
| 2012/0322610 A1* | 12/2012 | Sah | | B60W 10/02 477/5 |
| 2013/0296105 A1* | 11/2013 | Grutter | | B60K 6/48 477/5 |
| 2013/0296110 A1 | 11/2013 | Shelton et al. | | |
| 2013/0296129 A1* | 11/2013 | Itakura | | F16D 21/04 477/8 |
| 2013/0297105 A1* | 11/2013 | Yamazaki | | B60K 6/48 701/22 |
| 2013/0297109 A1* | 11/2013 | Nefcy | | B60W 20/00 701/22 |
| 2014/0148986 A1* | 5/2014 | Yoshikawa | | B60W 20/10 701/22 |

* cited by examiner

CONTROLLING A CLUTCH BETWEEN AN ENGINE AND A MOTOR DURING A SHIFT EVENT IN A HYBRID VEHICLE

TECHNICAL FIELD

The present disclosure relates to a control strategy for controlling an engine disconnect clutch for a shift event based on torque estimated to be present upon completion of the shift event.

BACKGROUND

When a vehicle shifts gears while accelerating, for example, an output of a transmission continues to increase in speed while the input to the transmission is able to reduce speed, allowing additional torque to be input into the transmission. For example, in a conventional non-hybrid vehicle, the engine speed can change from 6000 rpms to 2000 rpms due to a gear shift. With such a speed drop, a sudden torque bump is provided by the engine. If the torque bump is large enough, and the momentum and inertia of the spinning engine are also large enough, the operator of the vehicle may experience a perceivable "shift shock."

In certain types of hybrid electric vehicles, an electric motor may also selectively provide torque to the input of the transmission. If the motor is coupled to the engine such that they rotate together when providing torque throughout the gear shift, the motor presents even more factors that impact the torque bump and shift shock.

SUMMARY

According to one embodiment, a vehicle comprises a clutch and at least one controller. The clutch selectively couples an engine and an electric machine. The at least one controller is programmed to slip the clutch when locked in response to a drive torque (that is estimated to be present upon completion of an anticipated shift event) exceeding a combination of available regenerative torque and engine braking torque. This reduces engine torque transmitted downstream of the clutch during the anticipated shift event.

The torque estimated to be present upon completion of the anticipated shift event may include a difference between (i) an engine torque estimated to be available upon completion of the anticipated shift event and (ii) an engine torque prior to the shift event.

The engine torque estimated to be available after the anticipated shift event may be an estimated engine torque when the clutch is locked.

The vehicle may further comprise a gearbox having an input, wherein the available regenerative torque is a function of a speed of the input such that the at least one controller is programmed to slip the clutch based on the speed of the input.

The at least one controller may be further programmed to lock the clutch in response to a completion of the shift event.

According to another embodiment, a vehicle comprises a clutch and at least one controller. The clutch selectively couples an engine and an electric machine. The at least one controller is programmed to modulate an amount of slip in the clutch based on an amount of drive torque (estimated to be present upon completion of an anticipated shift event) that exceeds a combined available regenerative torque and engine braking torque. The modulation works to reduce engine torque transmitted downstream of the clutch during the anticipated shift event.

According to yet another embodiment, a method of reducing shift shock in a vehicle is provided. The method includes locking a clutch that selectively couples an electric machine to the engine. The method further includes scheduling an anticipated shift event in a gearbox. Finally, the method includes slipping the clutch in response to a torque, estimated to be present after the anticipated shift event, exceeding an available negative torque in the engine and electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
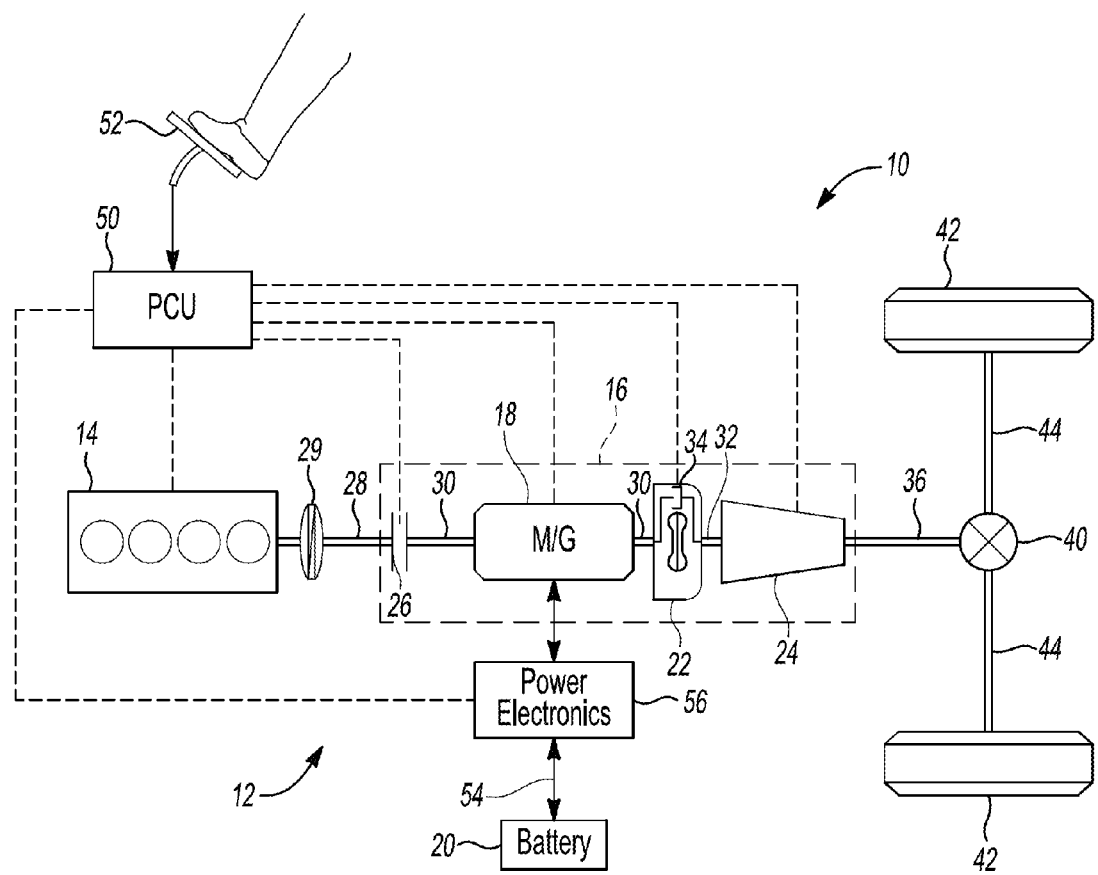
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine 18 such as an electric motor/generator (M/G) (coupled to an associated traction battery 20), a torque converter 22, and a multiple step-ratio automatic transmission, or gearbox 24.

The engine 14 and the electric machine 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the electric machine 18 when a disconnect clutch 26 between the engine 14 and the M/G 18 is at least partially engaged. The electric machine 18 may be implemented by any one of a plurality of types of electric machines. For example, electric machine 18 may be a permanent magnet synchronous motor. Power electronics condition direct current (DC) power provided by the battery 20 to the requirements of the electric machine 18, as will be described below. For example, power electronics may provide three phase alternating current (AC) to the electric machine 18.

When the disconnect clutch 26 is at least partially engaged, power flow from the engine 14 to the electric machine 18 or from the electric machine 18 to the engine 14 is possible. For example, the disconnect clutch 26 may be engaged and electric machine 18 may operate as a generator to convert rotational energy provided by a crankshaft 28 and electric machine shaft 30 into electrical energy to be stored in the battery 20. The disconnect clutch 26 can also be disengaged to isolate the engine 14 from the remainder of the powertrain 12 such that the electric machine 18 can act as the sole drive source for the HEV 10. A dual mass fly wheel (DMF) 29 may be provided along shaft 28 to maintain inertia and minimize driveline disturbances during engagement and disengagement of the disconnect clutch 26. Shaft 30 extends through the electric machine 18. The electric machine 18 is continuously drivably connected to the shaft 30, whereas the engine 14 is drivably connected to the shaft 30 only when the disconnect clutch 26 is at least partially engaged.

The electric machine 18 is connected to the torque converter 22 via shaft 30. The torque converter 22 is therefore connected to the engine 14 when the disconnect clutch 26 is at least partially engaged. The torque converter 22 includes an impeller fixed to electric machine shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the electric machine 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, electric machine 18, launch clutch 34, transmission gearbox 24, and power electronics

56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the electric machine 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the electric machine 18, and then from the electric machine 18 through the torque converter 22 and gearbox 24. The electric machine 18 may assist the engine 14 by providing additional power to turn the shaft 30. This operation mode may be referred to as a "hybrid mode" or an "electric assist mode."

To drive the vehicle with the electric machine 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the electric machine 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the electric machine 18 may act as a motor and provide a driving force for the powertrain 12. Alternatively, the electric machine 18 may act as a generator and convert kinetic energy from the powertrain 12 into electric energy to be stored in the battery 20. The electric machine 18 may act as a generator while the engine 14 is providing propulsion power for the vehicle 10, for example. The electric machine 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the electric machine 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Vehicles such as the hybrid vehicle exemplified in FIG. 1 may have significantly higher input inertia as compared to conventional vehicles. This is due to the fact that in addition to the engine 14 and the torque converter 22, there is an electric machine 18, a disconnect clutch 26, and an optional fly wheel (e.g., Dual Mass Flywheel, "DMF") 29 that is commonly used to minimize driveline disturbance during engagement and disengagement of the disconnect clutch 26. A DMF 29, if provided, not only is used to protect the disconnect clutch 26 from excessive torsional stress and fatigue, but also carries substantial inertia. During a high speed gear shift (i.e., gear shifts occurring when the shaft 30 or impeller is spinning at relatively high speeds), each of these elements in the powertrain presents factors that must be considered and controlled to yield a smooth shift event transition. For example, when the impeller is spinning relatively fast immediately prior to a shift event in the gearbox, the shift event can cause a torque bump in the powertrain due to the drastic decline in speed of the impeller after the shift event. During these high speed shift events, engine torque, if uncontrolled, naturally increases due to inertia and the reduction in speed of the impeller.

Figure 2:
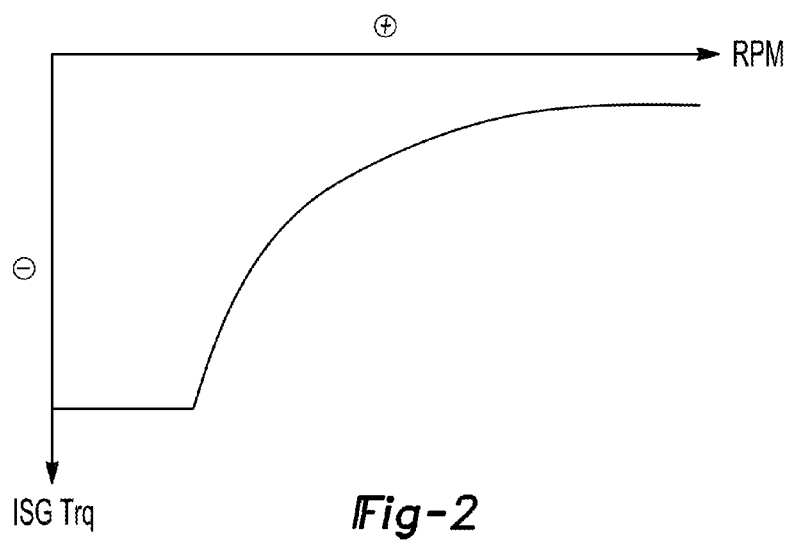
FIG. 2 is an exemplary plot of available negative torque in an electric machine as a function of speed, according to one embodiment.

During the inertia phase of these shift events, the engine torque should be reduced in the powertrain to compensate for the inertia torque bump created by the impeller speed drop. According to various embodiments of the present disclosure, the disconnect clutch 26 can be controlled to accommodate and mitigate this torque bump realized in the powertrain. For example, the hydraulic pressure at the disconnect clutch 26 can be commanded by the controller to decrease so as to allow for the disconnect clutch to slip during the high speed shift event. During some upcoming high speed shift events, the amplitude of the inertia torque bump can potentially exceed available engine torque and available negative electric machine torque at a given speed. See, for example, FIG. 2 illustrating a representation of an example of available negative torque in the electric machine as a function of speed. Reduction in pressure or slipping at the disconnect clutch 26 at these times can mitigate driveline disturbances at high speed shifts.

Figure 3:
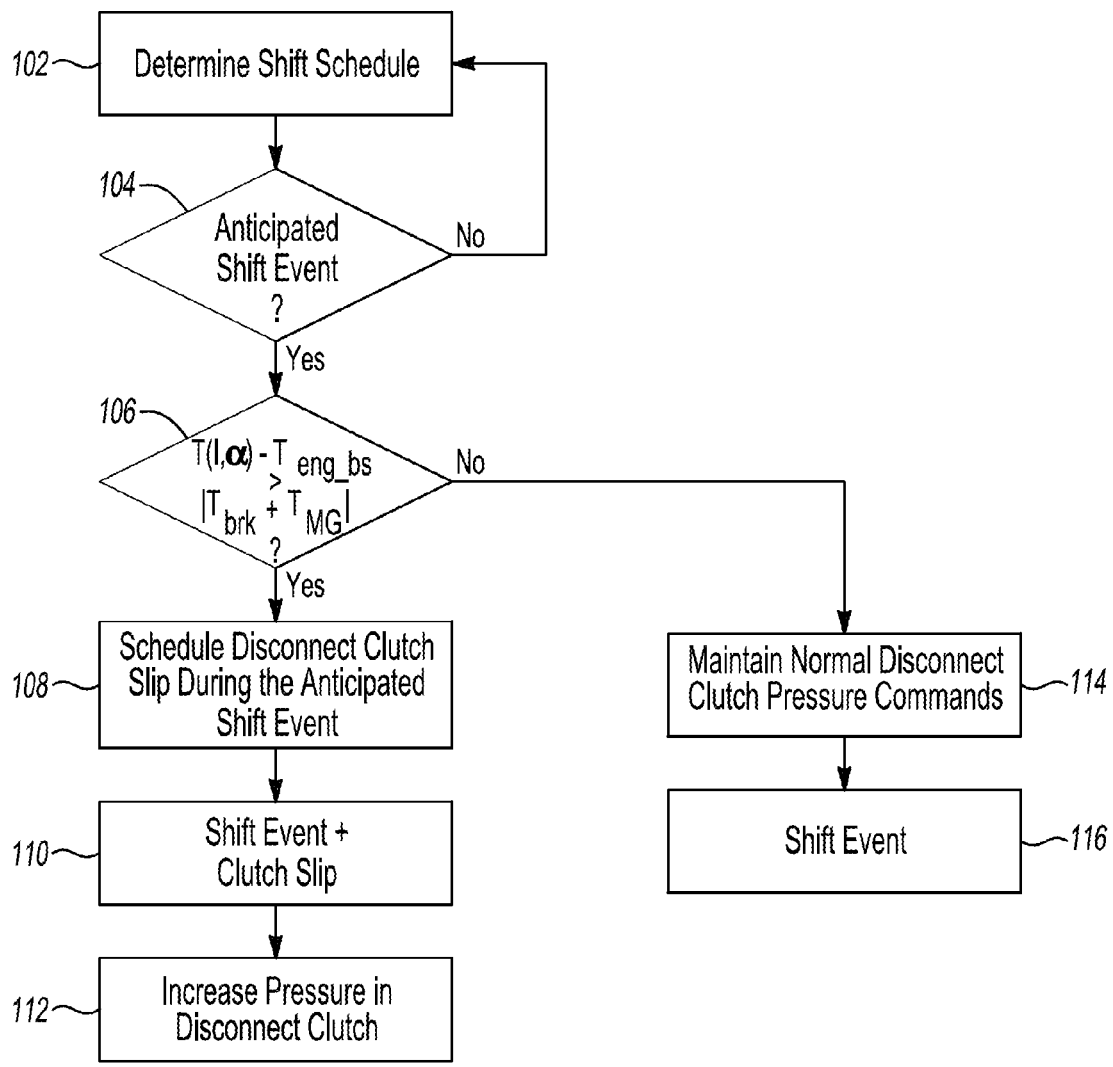
FIG. 3 is a flow chart illustrating one embodiment of a control strategy for controlling a disconnect clutch for a shift event based on torque estimated to be present upon completion of the shift event.

With reference to FIG. 3, one embodiment of a control strategy implemented by the controller is described below to reduce or eliminate the inertia realized in the powertrain, thus reducing or eliminating powertrain disturbances perceived by occupants of the vehicle during a shift event. First, at 102, the controller determines the shift schedule and thus conditions that indicate an anticipated shift event. Gear shifts can be commanded as a function of vehicle speed and accelerator pedal position; thus the shift schedule varies depending on these conditions. Therefore, the rotational speed of the impeller at the beginning of an anticipated shift event is predictable based on the shift schedule at any given time.

At 104, the controller determines whether an upcoming shift event is anticipated based on, for example, the vehicle speed and accelerator pedal position. The controller can estimate the anticipated shift event as a precise moment at which the gearbox will change gears.

If an upcoming shift event is anticipated, a comparison of torques is made to decide whether an alteration of the disconnect clutch is necessary to reduce anticipated "shift shock" due to the inertia during the shift at 106. For example, the controller can calculate an estimated amount of torque T reduction required due to the inertia at the input of the gearbox:

$$T = I\alpha \qquad (1)$$

where I is the inertia at the input of the gearbox and $\alpha$ is the anticipated angular acceleration of the input of the gearbox as a result of the shift. The acceleration $\alpha$ can be calculated based on the known ratios (e.g., based on number of teeth) of the commanded gears that are shifted. For example, an exemplary transmission gearbox has a $3^{rd}$ gear ratio of 1.912 and $2^{nd}$ gear ratio of 2.984 for a step constant of 1.560. Therefore, if a shift from $2^{nd}$ gear to $3^{rd}$ gear is commanded at 3500 RPM while the torque converter is locked after the shift, the speed of the gearbox input will be 3500/1.551=2257 RPM. The shifting strategy also maintains a target inertia transition time or phase time ($t_{shift}$) when the ratio changes due to the rise of oncoming clutch pressure during an upshift. Therefore, the acceleration $\alpha$ can be calculated as the difference of speed (3500−2257=1243 RPM) divided by the phase time $t_{shift}$:

$$\alpha = \frac{(\omega_2 - \omega_1)}{t_{shift}} \qquad (2)$$

where $\omega_2$ is the speed of the input of the gearbox (e.g., impeller) after the shift, $\omega_1$ is the speed of the input of the gearbox before the shift, and $t_{shift}$ is the inertia phase time.

The estimated amount of torque reduction required T is part of an overall comparison made at 106. The controller compares the following torques:

$$T(I,\alpha) - T_{eng\_bs} > |T_{brk} + T_{MG}| \qquad (3)$$

where $T_{eng\_bs}$ is measured engine torque before the shift event, $T_{brk}$ is engine pumping torque (i.e., engine braking torque, torque averaged over combustion cycle), and $T_{MG}$ is a minimum negative torque available from the electric machine (M/G) at $\omega_2$. With this comparison, the controller is effectively determining whether the difference between torque reduction required for the shift and the engine torque before the shift event exceeds a combination of sources of negative torque, e.g., the engine braking torque and the minimum available negative (e.g., regenerative) torque available in the electric machine. If such a relationship is true, the amplitude of the torque bump exceeds the available engine torque and available negative electric machine torque, resulting in the aforementioned "shift shock" that can be realized in the powertrain and by occupants of the vehicle.

If the relationship of 106 is true, then at 108 the controller can prepare and schedule the disconnect clutch to slip during the upcoming shift event. When the shift event occurs per its shift schedule, at 110 the controller commands the disconnect clutch to slip by, for example, commanding a decrease of hydraulic fluid at the clutch to reduce the clutch capacity. This slip therefore decouples the engine, flywheel, and part of the disconnect inertia from the remainder of the powertrain. This effectively reduces the overall inertia realized at the powertrain and reduces or eliminates the shift shock due to excessive torque.

The control strategy outlined above is best suited for situations in which the engine is on and the disconnect clutch is locked going into a scheduled shift event. Of course, if the disconnect clutch is already operating in a slipping state, the controller can reduce the pressure even further to reduce the torque.

At 112, the controller can re-lock the clutch after the completion of the shift event by, for example, commanding an increase in hydraulic pressure at the disconnect clutch. This returns the engine to its coupled state that it was in prior to the shift event.

If, however, the comparison at 106 is not true, the torque difference anticipated to occur during the upcoming shift event is not elevated to an amount would cause significant shift shock. Therefore, decoupling of the engine and flywheel may not be necessary. At 114, the controller therefore maintains normal disconnect clutch pressure commands, and at 116 the shift event occurs with this normal disconnect clutch pressure.

Figure 4:
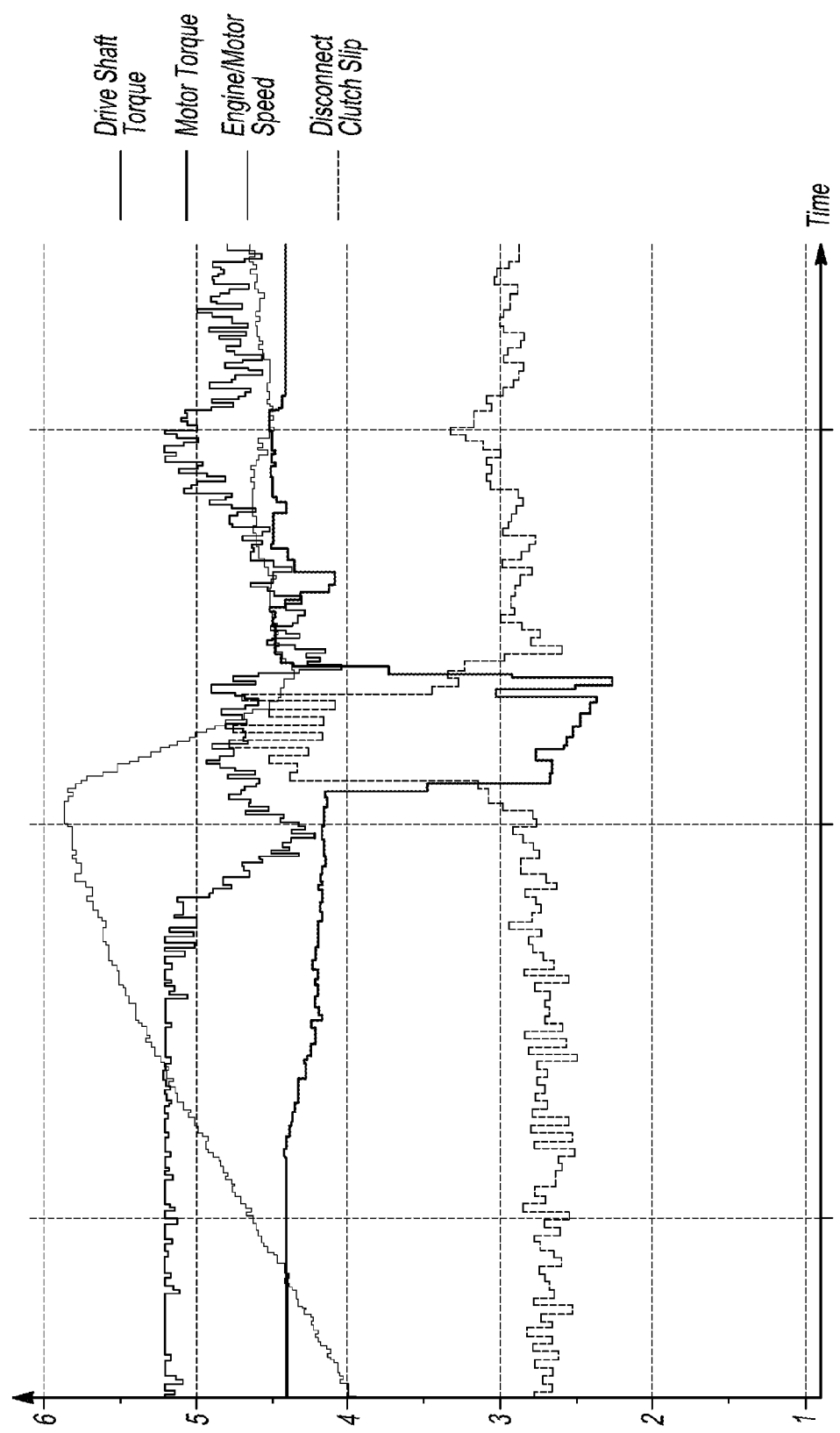
FIG. 4 is an exemplary plot of torques and speeds of various powertrain components prior to, and subsequent, a shift event.

An exemplary test result of a vehicle utilizing the control strategy described above is illustrated in FIG. 4. As the speed of the engine and electric machine increases while an anticipated shift event gets closer, the driveshaft torque begins to decrease. At approximately the same time, or immediately prior to, the shift event, the disconnect clutch begins to slip. The electric machine torque correspondingly decreases and the speeds of the engine and electric machine decrease with the new gear being active. The disconnect clutch returns to normal operation as the slip reduces subsequent to the shift event.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a clutch to selectively couple and decouple an engine and electric machine; and
    at least one controller programmed to slip the clutch when locked in response to a drive torque, estimated to be present upon completion of an anticipated shift event, exceeding a combination of available regenerative electric-machine torque and available engine braking torque to reduce engine torque transmitted downstream of the clutch during the anticipated shift event, wherein the torque estimated to be present includes a difference between (i) an engine torque estimated to be available upon completion of the anticipated shift event and (ii) an engine torque prior to the shift event.

2. The vehicle of claim 1, wherein the available regenerative torque includes a minimum available negative torque from the electric machine.

3. The vehicle of claim 1, wherein the engine torque estimated to be available after the anticipated shift event is an estimated engine torque when the clutch is locked.

4. The vehicle of claim 1, further comprising a gearbox with an input, wherein the available regenerative torque is a function of a speed of the input such that the at least one controller is programmed to slip the clutch based on the speed of the input.

5. The vehicle of claim 4, further comprising a torque converter having an impeller coupled to the input.

6. The vehicle of claim 1, wherein the at least one controller is further programmed to lock the clutch in response to a completion of the shift event.

7. A vehicle comprising:
    a clutch to selectively couple and decouple an engine and electric machine; and
    at least one controller programmed to modulate an amount of slip in the clutch based on an amount of drive torque, estimated to be present upon completion of an anticipated shift event, exceeding a combination of available regenerative electric-machine torque and engine braking torque to reduce engine torque transmitted downstream of the clutch during the anticipated shift event, wherein the torque estimated to be present includes a difference between (i) an engine torque estimated to be available upon completion of the anticipated shift event and (ii) an engine torque prior to the shift event.

8. The vehicle of claim 7, wherein the available regenerative torque includes a minimum available negative torque from the electric machine.

9. The vehicle of claim 7, wherein the engine torque estimated to be available after the anticipated shift event is an estimated engine torque when the clutch is locked.

10. The vehicle of claim 7, further comprising a gearbox with an input, wherein the available regenerative torque is a function of a speed of the input such that the at least one controller is programmed to slip the clutch based on the speed of the input.

11. The vehicle of claim 10, further comprising a torque converter having an impeller coupled to the input.

12. The vehicle of claim 7, wherein the at least one controller is further programmed to lock the clutch in response to a completion of the shift event.

13. A method of reducing shift shock in a vehicle comprising:
    locking a clutch that selectively couples and decouples an electric machine to an engine;
    scheduling an anticipated shift event in a gearbox; and
    slipping the clutch in response to a difference between an engine torque estimated to be available after the anticipated shift event and an engine torque prior to the anticipated shift event exceeding an available negative torque in the engine and electric machine.

14. The method of claim 13, wherein the available negative torque includes available engine braking torque and a minimum available negative torque from the electric machine.

15. The method of claim 13, wherein the clutch is locked when the slipping begins.

16. The method of claim 13, wherein the available negative torque in the electric machine varies as a function of a speed of an input to the gearbox such that the slipping is based on the speed of the input to the gearbox.

17. The method of claim 13, further comprising locking the clutch upon a completion of the shift event.

* * * * *